(12) United States Patent  (10) Patent No.: US 8,408,594 B2
Kibat  (45) Date of Patent: Apr. 2, 2013

(54) AIRBAG

(75) Inventor: Jonathan Richard Kibat, Warren, MI (US)

(73) Assignee: TK Holdings Inc., Auburn Hills, MI (US)

( * ) Notice: Subject to any disclaimer, the term of this patent is extended or adjusted under 35 U.S.C. 154(b) by 139 days.

(21) Appl. No.: 12/986,949

(22) Filed: Jan. 7, 2011

(65) Prior Publication Data

US 2011/0187087 A1  Aug. 4, 2011

Related U.S. Application Data (60) Provisional application No. 61/282,253, filed on Jan. 8, 2010, provisional application No. 61/306,799, filed on Feb. 22, 2010.

(51) Int. Cl.
*B60R 21/18* (2006.01)
(52) U.S. Cl. ...................................... 280/733; 280/730.2
(58) Field of Classification Search .................. 280/733, 280/801.1, 806, 730.2
See application file for complete search history.

(56) References Cited

U.S. PATENT DOCUMENTS

| | | | |
|---|---|---|---|
| 5,161,821 A | 11/1992 | Curtis | |
| 6,189,921 B1 * | 2/2001 | Takeuchi | 280/733 |
| 6,382,666 B1 * | 5/2002 | Devonport | 280/733 |
| 6,676,162 B2 * | 1/2004 | Gyllenspetz et al. | 280/808 |
| 6,692,020 B2 * | 2/2004 | Decomps et al. | 280/733 |
| 7,237,800 B2 | 7/2007 | Itoga | |
| 7,481,452 B2 * | 1/2009 | Itoga et al. | 280/733 |
| 7,798,522 B2 * | 9/2010 | Itoga | 280/730.1 |
| 7,874,582 B2 * | 1/2011 | Murakami | 280/733 |
| 8,016,362 B2 * | 9/2011 | Itoga | 297/471 |
| 2005/0189749 A1 * | 9/2005 | Itaoga et al. | 280/733 |
| 2006/0138757 A1 | 6/2006 | Riedel et al. | |
| 2007/0126213 A1 * | 6/2007 | Korechika | 280/730.2 |
| 2009/0160167 A1 * | 6/2009 | Itoga | 280/733 |
| 2009/0230662 A9 * | 9/2009 | Itoga | 280/733 |
| 2012/0038137 A1 * | 2/2012 | Wipasuramonton et al. | 280/733 |

* cited by examiner

*Primary Examiner* — Drew Brown
(74) *Attorney, Agent, or Firm* — Foley & Lardner LLP

(57) ABSTRACT

A seatbelt system for a vehicle includes a seatbelt anchor, a seatbelt connected to the seatbelt anchor, and an airbag mounted to the seatbelt anchor such that the airbag is provided separately from the seatbelt. The airbag may be a side airbag for a pelvic area of a vehicle occupant. The seatbelt system may deploy the airbag to a desired location in a short amount of time and in a precise manner with improved confidence that the airbag has been deployed to the desired location.

19 Claims, 8 Drawing Sheets

Fig. 18 ically to the field of
AIRBAG

CROSS REFERENCE TO RELATED APPLICATIONS

The present application claims priority to and the benefit of U.S. Provisional Patent Application No. 61/282,253, which was filed on Jan. 8, 2010 and U.S. Provisional Patent Application No. 61/306,799, which was filed on Feb. 22, 2010. Both of the foregoing provisional patent applications are incorporated by reference herein their entireties.

BACKGROUND

The present application relates generally to the field of airbags for use within motor vehicles. More specifically, this application relates to seatbelt integrated side-impact airbags that protect the pelvis and may further provide pretensioning of the seatbelt along the lap of the occupant.

SUMMARY

According to an embodiment, a seatbelt system for a vehicle may include a seatbelt anchor, a seatbelt connected to the seatbelt anchor, and an airbag mounted to the seatbelt anchor such that the airbag is provided separately from the seatbelt.

DETAILED DESCRIPTION

Side-impact airbag modules are located in vehicles to help protect occupants from injury during a dynamic vehicle impact or rollover event. A side-impact airbag module or system may include an airbag cushion, which deploys during a dynamic vehicle side-impact event or rollover event, whereby inflation gas is rapidly pushed into the inflatable cushion of the airbag system. A side-impact airbag module may further include an inflator, which may use a pyrotechnic device and/or compressed gas to generate inflation gas almost instantaneously and push the gas at a high volumetric flow rate into the inflatable cushion of the airbag system. Side-impact airbags are typically stored within and deployed from the roof-rail of a vehicle, the side of a seat system, such as from the side of a seat back, or from behind the interior plastic trim of a vehicle door or side structure. Side-impact airbags are typically packaged through a process of folding and rolling to compact the airbag to fit into the small storage volume. Side-impact airbags may be used to provide protection to occupants located in any seating row (e.g., first, second, third) of a vehicle and typically provide protection to outboard occupants when deployed.

Figure 1:
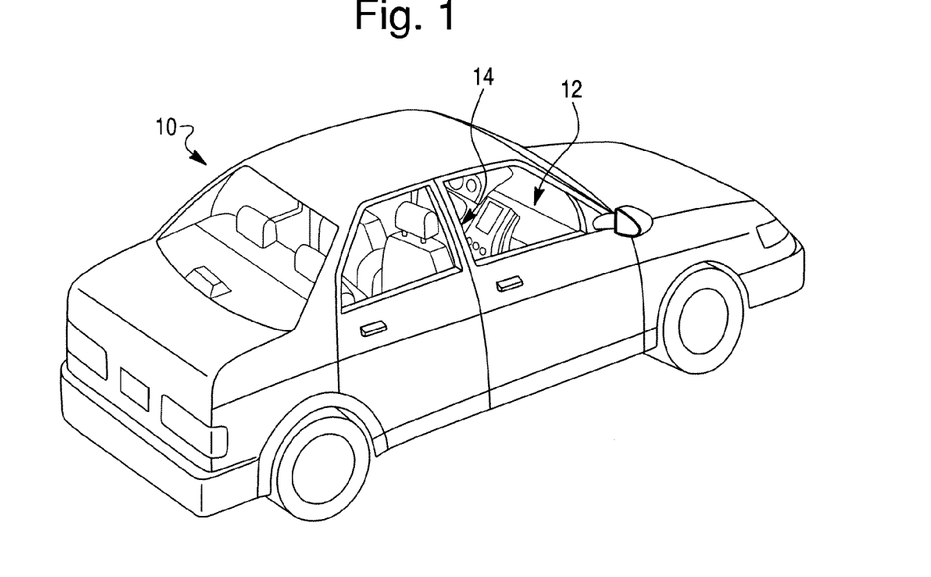
FIG. 1 is a perspective view of an exemplary embodiment of a motor vehicle.

With reference to FIG. 1, an exemplary embodiment of a motor vehicle 10 is illustrated and includes a passenger compartment 12. The passenger compartment 12 may include a seat system incorporating a safety system, which may provide occupant protection and restraint to a seated occupant during a rapid vehicle deceleration, during a vehicle side-impact event, during a vehicle roll-over event, or during another event of the vehicle that may trigger deployment of an airbag, such as a side-impact airbag 14. Those skilled in the art will recognize that the airbag systems disclosed herein may be included within any passenger vehicle and may be used to protect any occupant (e.g., driver, front passenger, rear passenger) and are not limited by the illustrations herein.

Figure 2:
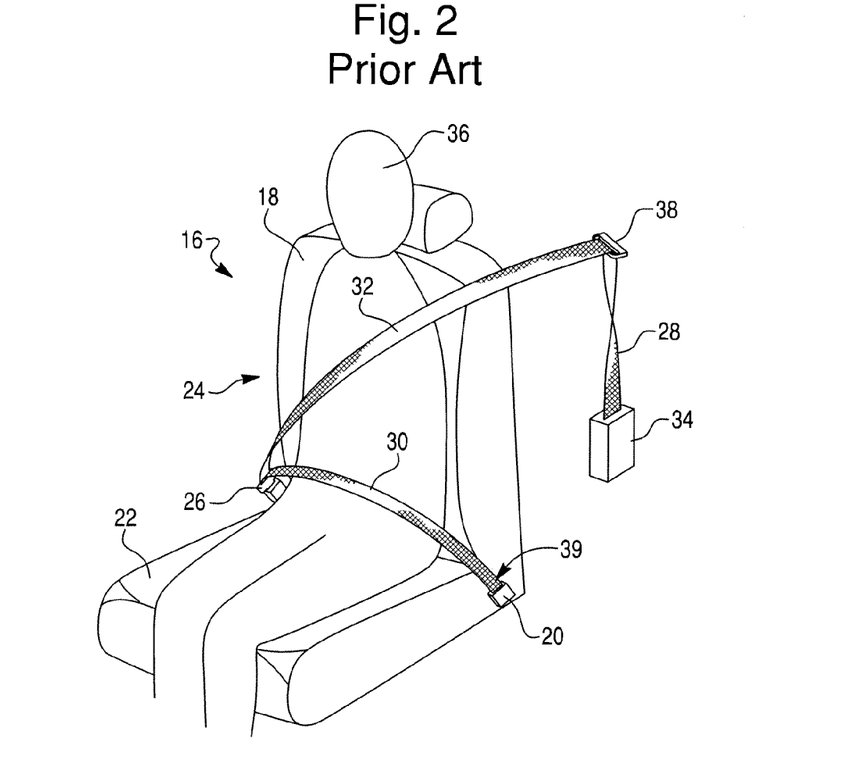
FIG. 2 is a perspective view of a conventional seat system configured with a conventional seatbelt system.

With reference to FIG. 2, an exemplary embodiment of a conventional seat system 16 is illustrated and includes a seat cushion 22, a seat back 18, and a conventional safety or seatbelt system 24. The seatbelt system 24 may be configured to include a webbing 28, a tongue member (not shown), a buckle mechanism 26, an anchor member 20 or bracket, a D-ring 38, and a retractor mechanism 34. The webbing 28 may be configured to include a first end 30, such as a portion extending over the lap of an occupant 36, and a second end 32, such as a portion extending over the shoulder or thorax of an occupant 36. The second end 32 of the webbing 28 may be coupled to the retractor 34 whereby the webbing 28 may be configured to wind and unwind from the retractor 34. The first end 30 of the webbing 28 may be coupled to the anchor member 20, such as at portion 39, as shown in the example of FIG. 2. The webbing between the first and second ends may be configured to pass through a slot in the D-ring 38, which may be fixedly coupled to the vehicle. The tongue member may be slideable along the webbing 28 between the D-ring 38 and anchor member 20, and may be configured to detachably couple to the buckle mechanism 26 to form a shoulder portion 32 of the webbing to restrain the torso or thorax of the seat occupant during vehicle deceleration and a lap portion 30 of the webbing to restrain the abdomen and pelvis of the seat occupant 36 during vehicle deceleration.

Due to the positioning of conventional side airbags in vehicle and seat trims which are located a distance from an occupant, conventional side airbags require a certain amount of time to inflate and deploy to a desired position to restrain the pelvis and/or thorax of the occupant.

An object is to provide a seatbelt system that deploys in a shorter amount of time. For example, an airbag cushion may deploy without being delayed by trim or other vehicle components or having such components affect the deployed position of the airbag. As a result, the deployment time of the airbag cushion may be reduced relative to existing side airbags.

In addition, the airbag may be configured to deploy along the path of the webbing, which may pass proximate to the H-point of the occupant and make deployment of the airbag to a desired position more reliable and repeatable. Conventional side-impact airbag cushions may initially deploy in a direction or from a position away from the occupant to breach the device the cushion is stored within, and may rely on tethers, cushion folding, or other deployment trajectory modification devices to direct deployment back towards the occupant and to a final deployed position. For example, a conventional side-impact airbag cushion configured to be stored within and to deploy from a seat back assembly may initially deploy in a direction away from the occupant and substantially perpendicular to the fore-aft vehicle direction in order to breach and clear the seat back assembly. In addition, the airbag module may be connected to or be provided as a portion of a seatbelt anchor, which may advantageously use the angle that the anchor projects in as a trajectory path for deployment of an airbag.

Another object is to provide an airbag module that may be readily integrated with current seatbelt assemblies for use in any vehicle with little or no modifications to the seatbelt or other vehicle assemblies. Configuring the airbag module to be located externally to a seat system permits the seat system to provide greater occupant comfort by adding more foam or incorporating other features desired by customers by using less space inside of the seat system. Further, the airbag may be modified with little or no impact to the other vehicle components due to the stand alone nature of the airbag module, therefore, the airbag module may be tailored to meet varying customer requirements without imposing changes upon surrounding systems and assemblies. Also, due to its stand-alone design, the airbag module may be more easily designed and adapted to be tuned to the needs of an occupant during a crash event.

In addition, the airbag cushion may be configured to provide pretensioning to the lap portion of the seatbelt webbing, which could eliminate the need for an anchor mounted pretensioning device.

Figure 3:
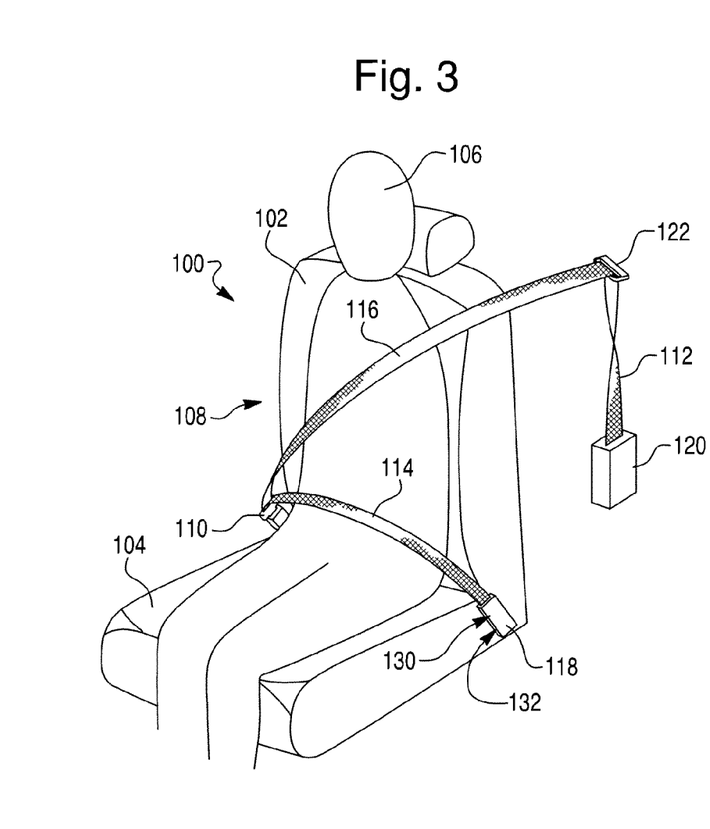
FIG. 3 is a perspective view of a seat system configured with a safety belt system, which includes an exemplary embodiment of seatbelt mounted pelvis airbag shown folded or undeployed.

FIG. 3 shows an exemplary embodiment of a seat system 100 for vehicle which may include a seat cushion 104, a seat back 102, and a seatbelt system 108. The seatbelt system 108 may include a webbing 114, a tongue member (not shown), a buckle mechanism 110, an anchor member 118 or bracket, a D-ring 122, and a retractor mechanism 120. The webbing 112 may be configured to include a first end 114, such as a portion extending over the lap of an occupant 106, and a second end 116, such as a portion extending over the shoulder or thorax of an occupant 106. The second end 116 of the webbing 112 may be coupled to the retractor 120 whereby the webbing 112 may be configured to wind and unwind from the retractor 120. The first end 114 of the webbing 112 may be coupled to the anchor member 118. The webbing between the first and second ends may be configured to pass through a slot in the D-ring 122, which may be fixedly coupled to the vehicle. The tongue member may be slideable along the webbing 112 between the D-ring 122 and anchor member 118, and may be configured to detachably couple to the buckle mechanism 110 to form a shoulder portion 116 of the webbing to restrain the torso or thorax of the seat occupant during vehicle deceleration and a lap portion 114 of the webbing to restrain the abdomen and pelvis of the seat occupant 106 during vehicle deceleration.

The seatbelt system 108 may include an airbag module 130, which may include an airbag cushion, an inflator, and at least one airbag retention mechanism. In the example shown in FIG. 3 the airbag is in a folded, undeployed state. The airbag cushion may be a single chamber or multiple chamber cushion such as, for example, a single chamber airbag configured to restrain the thorax and/or pelvis region of an occupant or a multiple chamber airbag configured to restrain the thorax and/or pelvis region of an occupant. In another example, the airbag may be a seatbelt mounted pelvis side-impact airbag (SMPSAB) module. The airbag cushion may be configured to restrain only the pelvis region of an occupant, which may advantageously reduce the amount of time the airbag cushion requires to be deployed in a shorter time with increased precision that the airbag will be deployed in a desired position.

According to an exemplary embodiment, an airbag retention mechanism 132 may be configured to directly couple the airbag module 130 to the anchor member 118 of the seatbelt system 108 to provide a structural fixing point from which the airbag cushion may deploy from. The airbag retention mechanism 132, being coupled to the anchor member 118, positions the folded airbag cushion proximate to the H-point (hip-point) of the occupant 106, which provides several advantages, some of which are disclosed below. In another example, the airbag modules described herein may be provided as a portion of the anchor member, such as by designing the airbag module and the anchor member together as a compound unit or as a single piece.

Several of the advantages of the embodiments described herein are as follows. First, because the airbag is located externally to a seat or other vehicle component (e.g., roof-rail), the airbag cushion may deploy in a short period of time without being delayed, or substantially delayed, by trim or other vehicle components, or having such components affect the deployed position of the airbag. Second, the deployment time of the airbag cushion may be reduced relative to existing side airbags, since the cushion no longer deploys through a trim component and has a shorter distance to deploy in order to be in the correct position relative to the H-point (or pelvis region) of the occupant. Third, the desired deployed position of the airbag cushion is more reliable and repeatable, because the airbag cushion may be configured to deploy along the path of the webbing, which may pass proximate to the H-point of the occupant. Conventional side-impact airbag cushions may initially deploy in a direction or from a position away from the occupant to breach the device the cushion is stored within, and may rely on tethers, cushion folding, or other deployment trajectory modification devices to direct deployment back towards the occupant and to a final deployed position. For example, a conventional side-impact airbag cushion configured to be stored within and to deploy from a seat back assembly may initially deploy in a direction away from the occupant and substantially perpendicular to the fore-aft vehicle direction in order to breach and clear the seat back assembly. Fourth, the airbag cushion may be integrated with current seatbelt assemblies for use in any vehicle with little or no modifications to the seatbelt or other vehicle assemblies and provides enhanced flexibility in the capabilities of the airbag module to be tuned to the needs of an occupant, such as during a crash event. Fifth, the airbag module being external to the seat system permits the seat system to provide greater occupant comfort by adding more foam or to incorporate other customer desired features by freeing up packaging space in the seat system. Sixth, the airbag cushion may be configured to provide pretensioning to the lap portion of the webbing, which could eliminate the need for an anchor mounted pretensioning device. Seventh, the airbag may be modified with little or no impact to the other vehicle components due to the stand alone nature of the airbag module, therefore, the SMPSAB may be tailored to meet varying customer requirements without driving changes to surrounding systems and assemblies.

An airbag module may be packaged into a relative small volume to provide unobtrusive and aesthetic storage, and the airbag cushion may be configured for storage through a process of folding and rolling to reduce the stored volume. According to an example, once folded and rolled, the airbag cushion may include one or more non-structural tack stitches or other coupling methods to retain the stored configuration of the cushion. These tack stitches may be configured to tear from a relative low force, such as during initial airbag deployment, to permit proper and efficient airbag cushion deployment. According to another example, the folded and rolled airbag cushion may be placed in a storage device, such as a plastic housing or fabric wrap.

The airbag cushion may be made from any suitable material (e.g., woven polymer fabric) and may be coated with a suitable sealant (e.g., silicone) to prohibit inflation gas from escaping due to the porosity of the cushion material. The airbag cushion may be configured in any useful shape. According to an exemplary embodiment, the airbag cushion may take a substantially circular shape in the unfolded condition. According to another exemplary embodiment, the airbag cushion may take a substantially tear drop shape in the unfolded condition. Those skilled in the art will recognize the airbag cushion may be tailored to have any suitable shape and any suitable size, and the airbag assembly may include any configuration of inflator to meet varying customer requirements and the illustrations herein are not meant as limitations.

Figure 4:
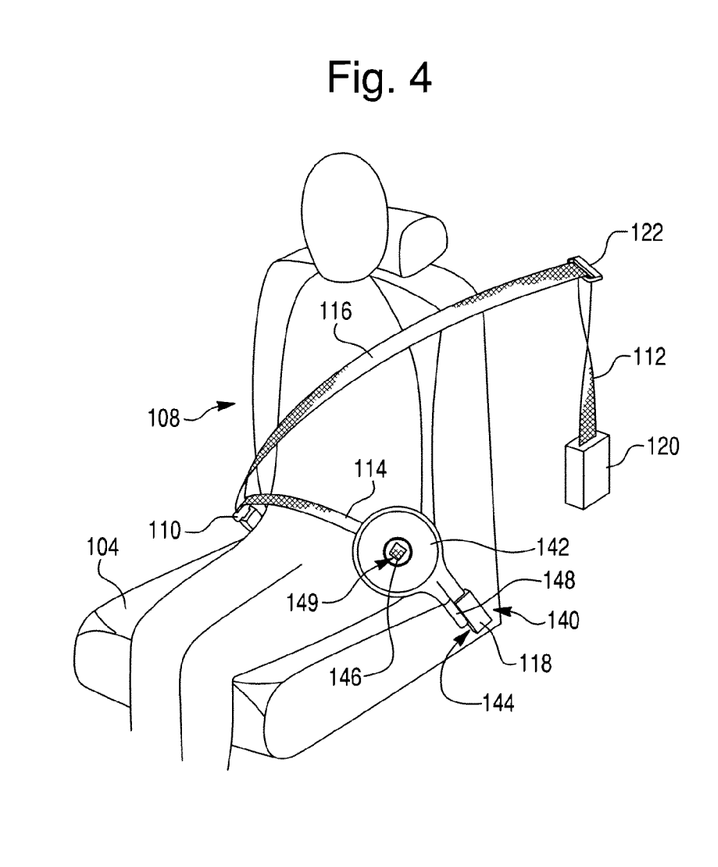
FIG. 4 is a perspective view of a seat system configured with a safety belt system, which includes an exemplary embodiment of a seatbelt mounted pelvis airbag shown deployed or unfolded.

FIG. 4 shows an example of an airbag assembly 140 that is coupled to the anchor 118 of a vehicle seat and may be configured to part of the airbag module 130 shown in FIG. 3. The airbag assembly 140 may include an airbag cushion 142, a first airbag retention mechanism 144, and an inflator 148. In the example shown in FIG. 4 the airbag cushion 142 is in a deployed state in which the airbag cushion 142 has inflated and projected outwards from the position of the airbag assembly 140. The first airbag retention mechanism 144 may be configured to connect the airbag assembly 140 to the anchor 118, such as by directly connecting the airbag assembly to the anchor, which may provide a structural fixing point from which the airbag cushion may deploy from. The first airbag retention mechanism 144 may further be configured to position the airbag assembly 140 such that the airbag cushion 142 deploys along an angle projected by the anchor 118, such as along at least a portion of the lap portion 114 of the webbing.

The airbag assembly 140 may further include a second airbag retention mechanism 146 to connect the airbag cushion 142 to the seatbelt, such as the lap portion 114 of the seatbelt webbing. The second airbag retention mechanism 146 may further ensure proper and consistent deployment of the airbag cushion 142 by serving as a guide for airbag deployment. During deployment, the airbag will unfold and expand away from the fixed anchor position, whereby as the airbag cushion 142 expands, the second airbag retention mechanism 146 may slide with the airbag cushion 142 along the webbing away from the fixed anchor position. Thus, the webbing acts as a guide path for deployment of the airbag. This improves reliability and ensures a proper deployed position, because the webbing is configured to be routed proximate to the pelvic area and H-point of an occupant, therefore enhancing protection of the hip or pelvis region of the occupant by the deployed airbag.

Such a second airbag retention mechanism 146 may act as a guide for the airbag as it is deployed so that the airbag cushion 142 is quickly deployed along an external surface of the seatbelt and in a desired position, such as in an occupant's pelvic region. Such an external surface of a seatbelt is opposite to an internal side of a seatbelt webbing, which faces and may be proximately adjacent to an occupant. The second airbag retention mechanism 146 may be, for example, a tether, strap, stitching, or other connection device used in the art, including combinations of these features. In the example shown in FIG. 4, the airbag module 140 is configured such that the airbag cushion 142 is deployed on the outer surface of the seatbelt in relation to an occupant, but other configurations of the airbag module and the deployed configuration of the airbag cushion may be utilized. In addition, the second airbag retention mechanism 146 may be positioned within a perimeter of the cushion, such as near a center or substantial center of the inflated portion of the airbag cushion 142, as shown in the example of FIG. 4, or may be located within other inflated or non-inflated portions of the airbag cushion, such as a periphery or edge of the airbag cushion.

Figure 5:
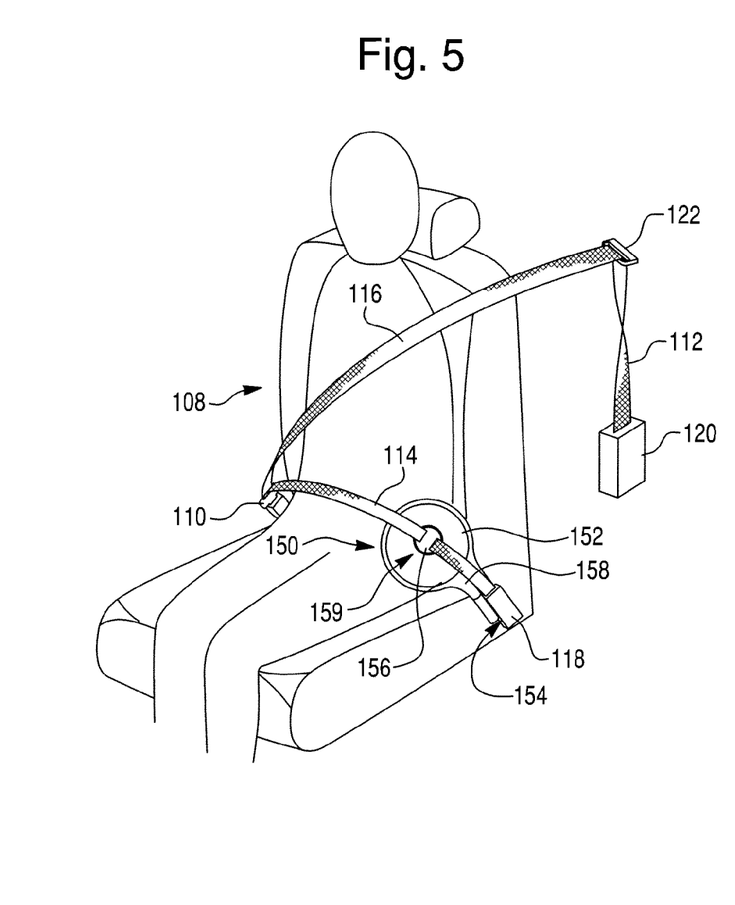
FIG. 5 is a perspective view of a seat system configured with a safety belt system, which includes another exemplary embodiment of a seatbelt mounted pelvis airbag shown deployed or unfolded.

FIG. 5 shows another example of an airbag assembly 150 that may be configured to part of the airbag module 130 shown in FIG. 3. The assembly 150 includes an airbag cushion 152, a first airbag retention mechanism 154 to connect the assembly to an anchor 118, and an inflator 158. The airbag assembly 150 may further include a second airbag retention mechanism 156 which connects the airbag cushion 152 to a seatbelt, such as a lap portion of the seatbelt webbing, so that the airbag cushion 152 is guided by the seatbelt as it is deployed, which may decrease the amount of deployment time and further insure that the airbag cushion 152 is precisely deployed into a desired position. The second airbag retention mechanism 156 may include, for example, a tether 159 or other connection device that the seatbelt may be routed through to connect the airbag cushion 152 to the seatbelt.

In the example shown in FIG. 5, the airbag assembly 150 is configured such that the airbag cushion 152 is deployed along an inner surface of the seatbelt, such that the airbag cushion 152 is deployed between the seatbelt, such as the lap portion 114 of the seatbelt webbing, and an occupant. During a vehicle event that triggers airbag deployment, the retractor of a seatbelt system may lock to prohibit payout (or unwinding) of the webbing of the seatbelt from the retractor. The airbag cushion 152 may expand due to inflation gas from the inflator 158 and deploy and expand between the seatbelt and the occupant, causing a force to be exerted upon the seatbelt due to pressing of the inflating airbag cushion 152 upon the surfaces of the occupant and the seatbelt. Such additional pressure exerted upon the seatbelt by the airbag cushion 152 may act to remove the clearance between the occupant and the webbing, whereby once the clearance is removed, the continuing airbag deployment imparts a force on the webbing that puts the webbing in tension. This tension provided by the configuration of the airbag provides pretensioning to the seatbelt assembly and may eliminate the need for the anchor assembly and/or buckle assembly to include a pretensioning device, which simplifies the design of a seatbelt system and reduces its cost. Pretensioning of the seatbelt improves occupant safety by reducing the amount of deflection or displacement an occupant is permitted to undergo during a sudden vehicle deceleration by reducing clearance or slack between the occupant and the restraint or safety device, which reduces the inertia or kinetic energy generated by the occupant and in turn reduces the restraint forces imparted into the occupant.

Figure 6:
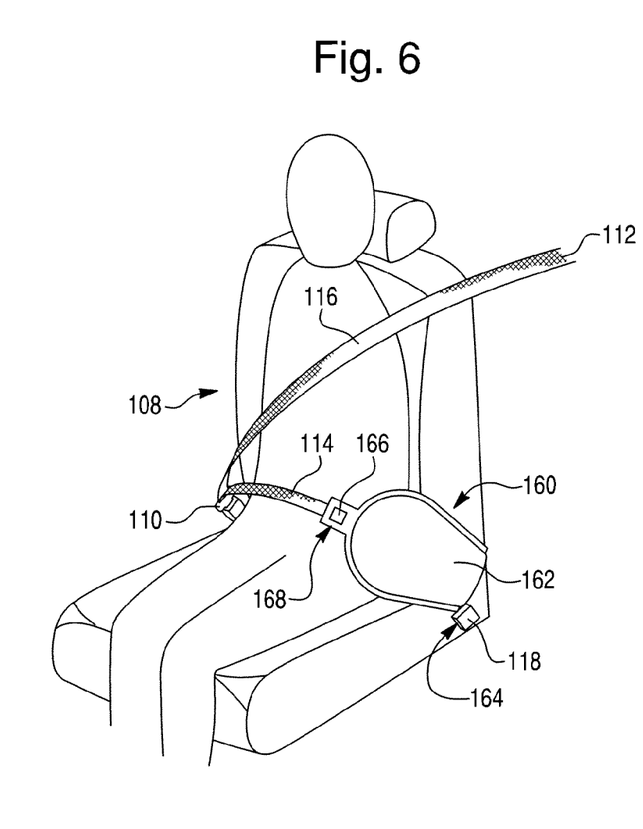
FIG. 6 is a perspective view of a seat system configured with a safety belt system, which includes another exemplary embodiment of a seatbelt mounted pelvis airbag shown deployed or unfolded.

FIG. 6 shows another example of an airbag assembly 160 that may be configured to part of the airbag module 130 shown in FIG. 3. The assembly 160 may include an airbag cushion 162, a first airbag retention mechanism 164. As shown in the example of FIG. 6, the airbag cushion 162 may be configured to deploy along an external surface of the seatbelt. The airbag assembly 160 may further include a second airbag retention mechanism 166 located on a periphery or edge of the airbag cushion 162 to connect the airbag cushion 162 to the seatbelt, such as the lap portion 114 of the seatbelt webbing. As shown in the example of FIG. 6, the second airbag retention mechanism 166 may be located outside of an inflated portion of the airbag cushion 162, such as at an edge or periphery of the airbag cushion 162. The second airbag retention mechanism 166 may be a connection device to connect the airbag cushion 162 to the seatbelt, such as a tether 168, or other connection device used in the art.

Figure 7:
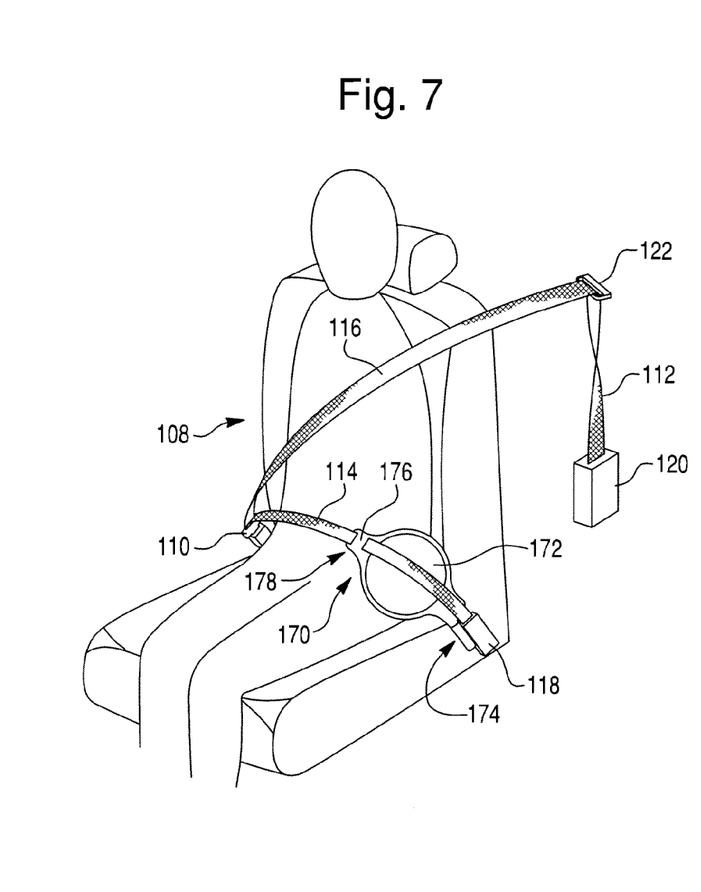
FIG. 7 is a perspective view of a seat system configured with a safety belt system, which includes another exemplary embodiment of a seatbelt mounted pelvis airbag shown deployed or unfolded.

FIG. 7 shows another example of an airbag assembly 170 that may be configured to part of the airbag module 130 shown in FIG. 3. The assembly 170 may include an airbag cushion 172, a first airbag retention mechanism 174. The airbag assembly 170 may further include a second airbag retention mechanism 176, such as a connection device 178, to connect the airbag cushion 172 to a portion of the seatbelt, such as a lap portion 114 of the seatbelt webbing, so that the airbag is guided by the seatbelt upon deployment, with the airbag assembly 170 being configured such that the airbag cushion 172 is deployed along an inner surface of the seatbelt, between an occupant and the seatbelt. As discussed in the examples herein wherein the airbag is configured to deploy in such a position, the deployment of the airbag between the occupant and the seatbelt advantageously provides tension to the seatbelt, which may improves occupant safety by reducing the amount of deflection or displacement the occupant is permitted to undergo during a sudden vehicle deceleration by reducing clearance or slack between the occupant and the restraint or safety device, and may eliminate the need for a pretensioning device in a seatbelt system.

Figure 8:
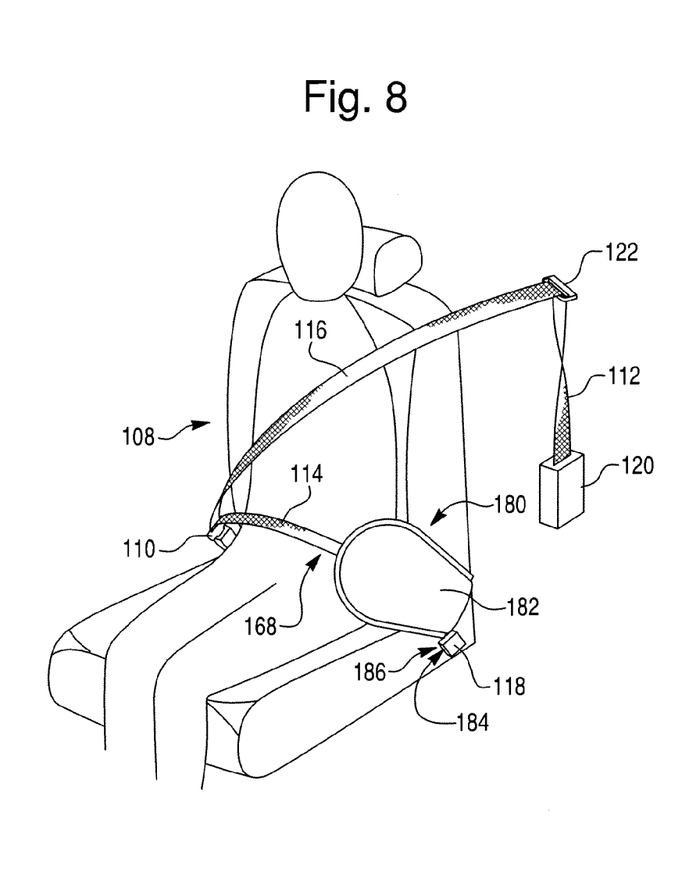
FIG. 8 is a perspective view of a seat system configured with a safety belt system, which includes another exemplary embodiment of a seatbelt mounted pelvis airbag shown deployed or unfolded.

Another example of an airbag assembly 180 that may be configured to part of the airbag module 130 shown in FIG. 3., is shown in FIG. 8. The assembly 180 may include an airbag cushion 182, and an airbag retention mechanism 184. In the example shown in FIG. 8, the airbag assembly does not include a second airbag retention mechanism to connect the airbag cushion 182 to the seatbelt and the airbag assembly 180 is configured such that the airbag cushion 182 deploys along an external surface of the seatbelt. In this configuration the airbag cushion 182 deploys from the relative fixed anchor position 186 in a direction substantially along the lap portion 114 of the webbing to provide protection to an occupant, such as the hip portion of the seat occupant.

Figure 9:
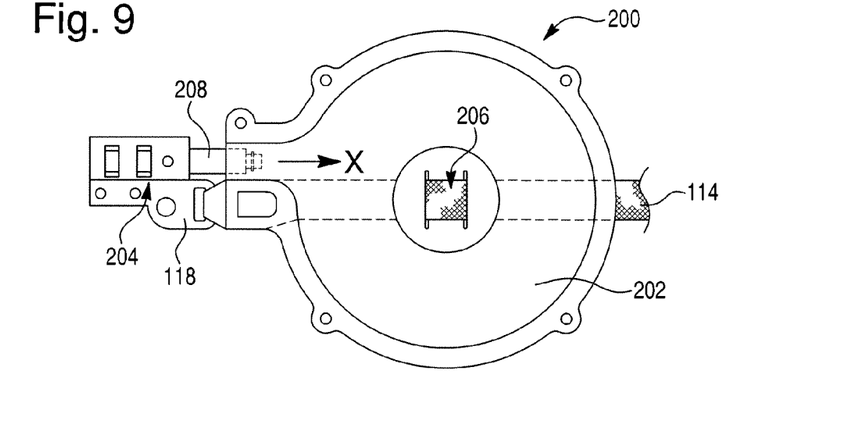
FIG. 9 is a front view of an exemplary embodiment of an airbag assembly for use within a seat safety system, such as the system of FIG. 4, and is illustrated deployed or unfolded.
Figure 10:
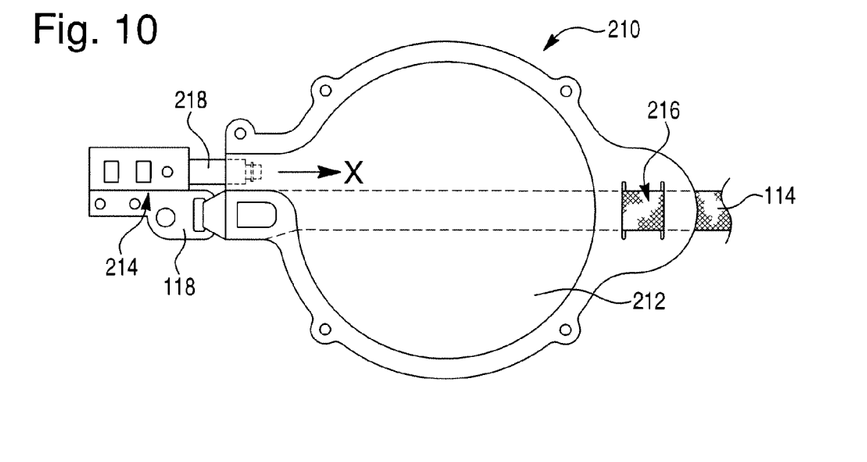
FIG. 10 is a front view of another exemplary embodiment of an airbag assembly for use within a seat safety system and is illustrated deployed or unfolded.
Figure 11:
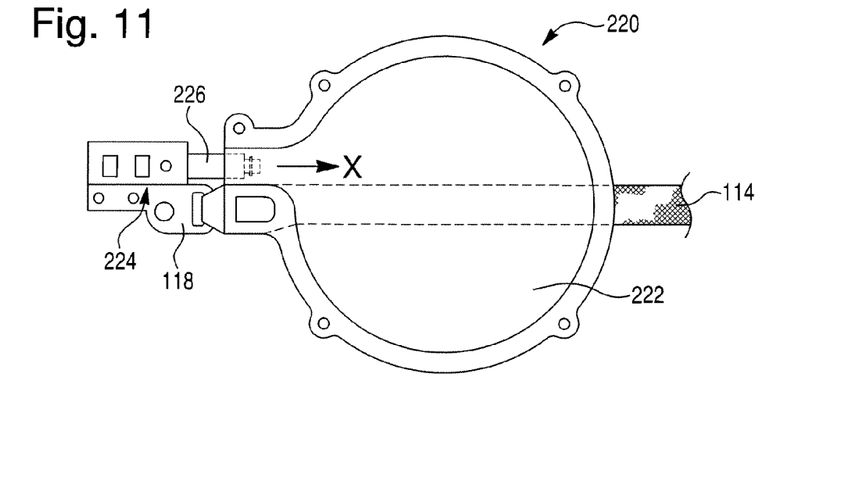
FIG. 11 is a front view of another exemplary embodiment of an airbag assembly for use within a seat safety system and is illustrated deployed or unfolded.

With reference to FIGS. 9 thru 14, examples of an airbag assembly or module are illustrated and shown with the airbag cushion in a deployed or unfolded state. FIG. 9 shows an example of an airbag assembly 200 which may include an airbag cushion 202, a first airbag retention mechanism 204 to connect the airbag assembly 200 to an anchor 118 of a seatbelt system, and an inflator 208. The airbag assembly 200 may further include a second airbag retention mechanism 206 to connect the airbag cushion 202 to a seatbelt, such as the lap portion 114 of the seatbelt webbing, with the second airbag retention mechanism 206 being provided within a within a perimeter of the airbag cushion 202, such as within an inflated portion of the airbag cushion 202. The example shown in FIG. 10 shows an airbag assembly 201 which may include an airbag cushion 212, a first airbag retention assembly 214, an inflator 218, and a second airbag retention mechanism 216 to connect the airbag cushion 212 to a seatbelt, with the second airbag retention mechanism 216 being located on an edge or periphery of the airbag cushion 212, such as in a non-inflated region of the airbag cushion. FIG. 11 shows an example of an airbag assembly 220 which may include an airbag cushion 222, an airbag retention mechanism 224 to connect the airbag assembly 220 to an anchor 118 of a seatbelt system, and an inflator 226.

Figure 12:
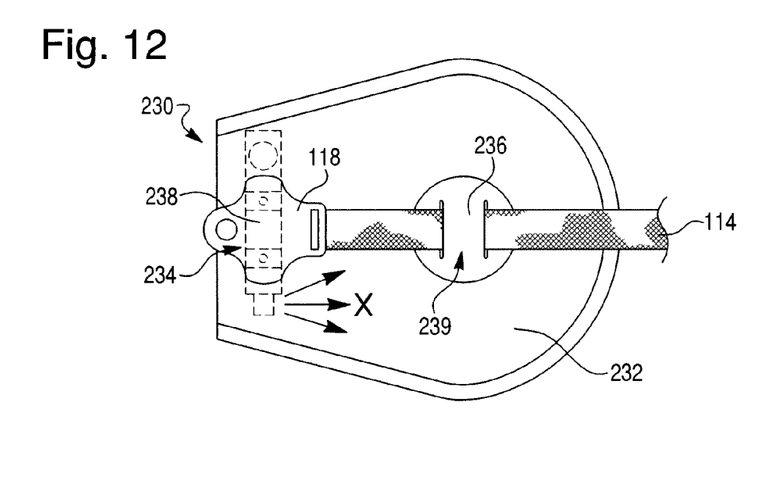
FIG. 12 is a front view of another exemplary embodiment of an airbag assembly for use within a seat safety system and is illustrated deployed or unfolded.
Figure 13:
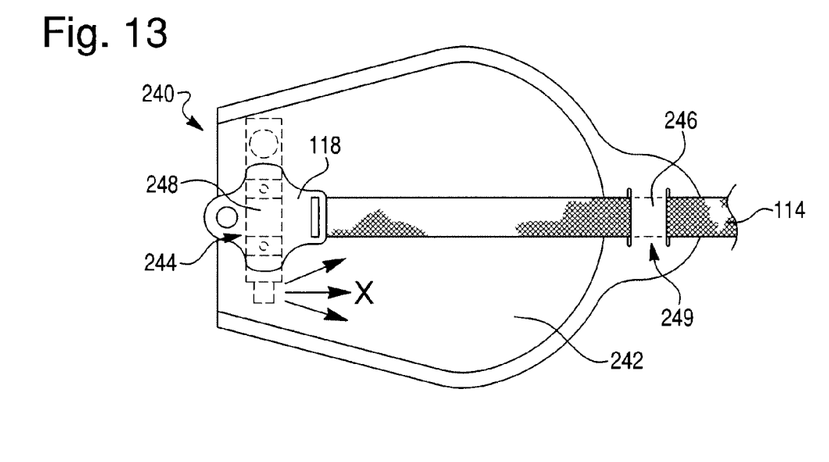
FIG. 13 is a front view of another exemplary embodiment of an airbag assembly for use within a seat safety system, such as the system of FIG. 6, and is illustrated deployed or unfolded.
Figure 14:
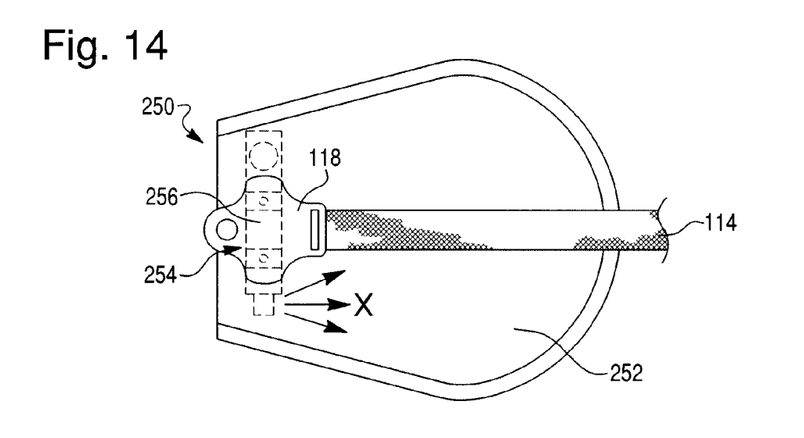
FIG. 14 is a front view of another exemplary embodiment of an airbag assembly for use within a seat safety system, such as the system of FIG. 8, and is illustrated deployed or unfolded.

FIG. 12 depicts an example of an airbag assembly 230 which may include an airbag cushion 232, a first airbag retention mechanism 234, a second airbag retention mechanism 236, which may include a connection device 239, such as a tether or other connection device, to connect the airbag cushion 232 to a seatbelt, and an inflator 238. FIG. 13 shows an example of an airbag module 240 which may include an airbag cushion 242, a first airbag retention mechanism 244, a second airbag retention mechanism 246, which may include a connection device 249, such as a tether or other connection device, located at a periphery or edge of the airbag cushion 242, such as in an uninflated region of the airbag cushion 242. FIG. 14 shows an example of an airbag module 250 which may include an airbag cushion 252, an airbag retention mechanism 254 to connected the airbag assembly 250 to an anchor 118, and an inflator 256.

In the examples described herein, an inflator of an airbag assembly may be configured to be an axial flow inflator, such as the inflators shown in the examples of FIGS. 9-11, whereby gas generated is forced out in a substantially linear direction, that provides a flow of inflation gas in the direction indicated by arrow X in the examples of FIGS. 9-11, through a single or plurality of outlets or orifices of the inflator. According to another example, an inflator may be configured to be a radial flow inflator, such as the inflators shown in FIGS. 12-14, whereby gas generated is forced out in a substantially radial direction through a diametrically shaped outlet, as in the directions indicated by arrows X in the examples of FIGS. 12-14.

According to an example, the second airbag retention mechanism, including a connection device of the second airbag retention mechanism, may be configured as a strap or tether formed out of (or from) a portion of a non-inflatable portion of an airbag cushion, whereby the webbing of a seatbelt may route (may pass) through an opening formed by the tether and one or more adjacent portions of the cushion to substantially retain the cushion from moving relative to the webbing in a direction perpendicular to the longitudinal direction of the webbing. This configuration is similar to a belt passing through a belt loop. Thus, the webbing may pass between the tether and adjacent portion(s) of the airbag cushion to retain the airbag cushion, so that substantial movement of the cushion relative to the webbing may be limited to sliding of the cushion along the webbing during deployment.

According to an exemplary embodiment, the second airbag retention mechanism may be configured to be positioned in a non-inflatable portion configured substantially in the center portion of the airbag cushion, such as shown in the examples of FIGS. 9 and 12. The non-inflatable portion may be configured to be any suitable shape, such as circular as shown in FIGS. 9 and 12. According to another example, the second airbag retention mechanism may be configured to be positioned in a non-inflatable portion on the end of the airbag cushion opposite to the inflator coupling end, such as shown in FIGS. 10 and 13. According to yet another example, the second airbag retention mechanism may be configured to be positioned in a non-inflatable portion positioned anywhere on the airbag cushion. Those skilled in the art will recognize that the second airbag retention mechanism may be configured to be positioned on any suitable portion of the cushion having any suitable shape, whereby the location may be tailored to meet varying customer requirements and packaging constraints. Those skilled in the art will further recognize that an airbag may be configured to have any number of airbag retention mechanisms, and is not limited to include one or two such mechanisms.

Figure 15:
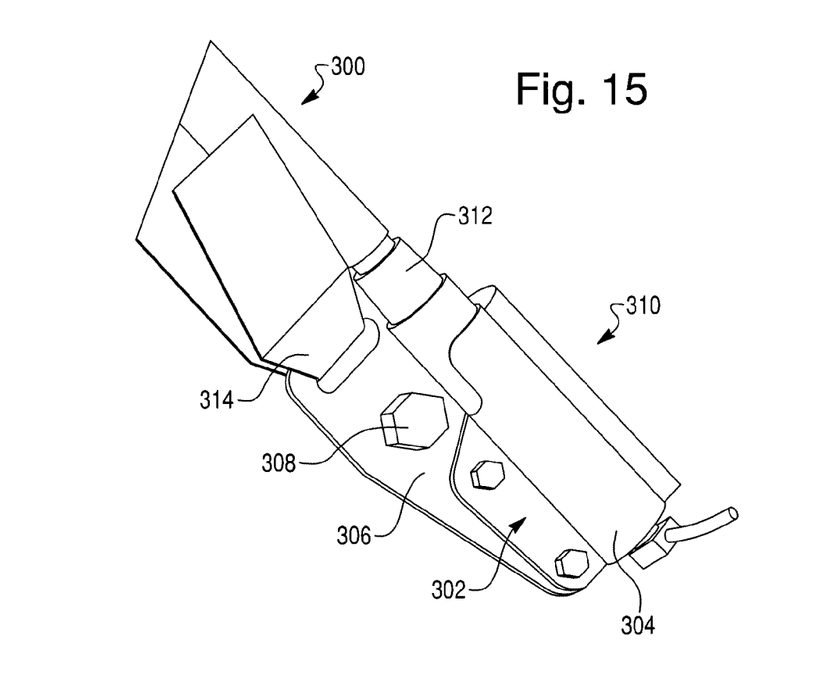
FIG. 15 is a perspective view of an exemplary embodiment of an airbag retention mechanism coupling the seatbelt mounted side-impact airbag system to the anchor member of the seatbelt assembly.

The first retention mechanism may be made from, for example, steel or any other suitable material that may provide a relative structural coupling. According to an example, the first retention mechanism 310 of an airbag assembly 300 may include a mounting bracket 302 formed to retain the inflator 312 of the airbag assembly, such as in a portion 304 shaped to retain the inflator, and configured to couple to an anchor bracket 306, such as by a fastening mechanism, that may be connected to the webbing 314 of seatbelt and configured to be mounted to a vehicle, such as by another fastening mechanism 308, as shown in the example of FIG. 15. The mounting bracket 302 may be connected or directly connected to an anchor or may be formed as a unit or a single piece with the anchor. The fastening mechanism may be one or more mechanical fasteners, such as bolts, or may be any suitable fastener. The fastening mechanism may also be a welded joint, formed by, for example, a MIG, laser, or any other suitable welding process. According to an example, the airbag cushion may couple to the mounting bracket 302 of the first retention mechanism 310 to permit the cushion to deploy from the substantially fixed couple location in a direction substantially towards the pelvis region of an occupant. According to other examples, the airbag cushion may couple to the anchor bracket of the seatbelt assembly and/or to the inflator to permit the cushion to deploy from the couple location in a direction substantially along the webbing to protect the pelvis of the occupant.

Figure 16:
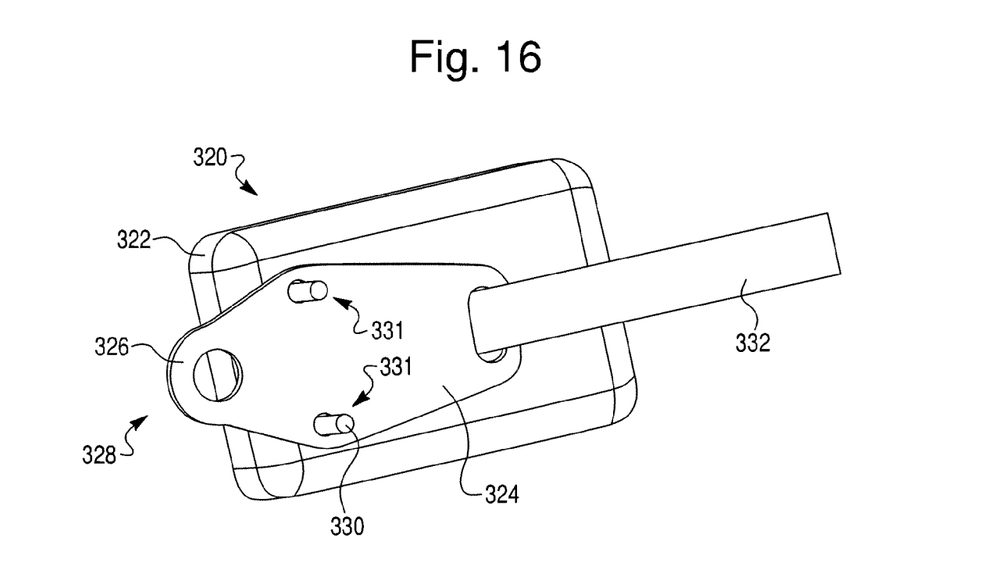
FIG. 16 is a perspective view of another exemplary embodiment of an airbag retention mechanism coupling the seatbelt mounted side-impact airbag system to the anchor member of the seatbelt assembly.

FIG. 16 shows an example of an airbag assembly 320 which may include a housing 322 connected to a webbing 332 of a seatbelt, and a first retention mechanism 328. The first retention mechanism 328 may be an anchor or mounting bracket 324 which includes a seatbelt fastener hole 326 and one or more fastening mechanisms 330, such as the bolts 331 shown in the example of FIG. 16, to attach the anchor 324 to a vehicle. The housing 322 may be made of a plastic material and configured to cover a folded and rolled airbag cushion. The airbag assembly 320, including its housing 322, may offer protection to the airbag cushion while the airbag is stored and the housing 322 may be configured to tear or deform with relative little resistance during deployment of the airbag cushion to permit proper and efficient airbag cushion deployment with little or no delay in the deployment of the airbag.

According to another example, the plastic housing 322 may include a reinforcing bracket made from a strong material, such as steel (or other suitable material), which permits coupling of the plastic housing 322 to the anchor 324 by means of a fastening mechanism and provides improved strength, which may help retain the coupled portion of the airbag cushion during deployment. According to another example, the plastic housing may provide for coupling to the webbing of the seatbelt assembly as a method for substantially fixing a portion of the plastic housing, which permits the airbag cushion to deploy from the substantially fixed portion in a direction substantially towards the pelvis of the occupant.

Figure 17:
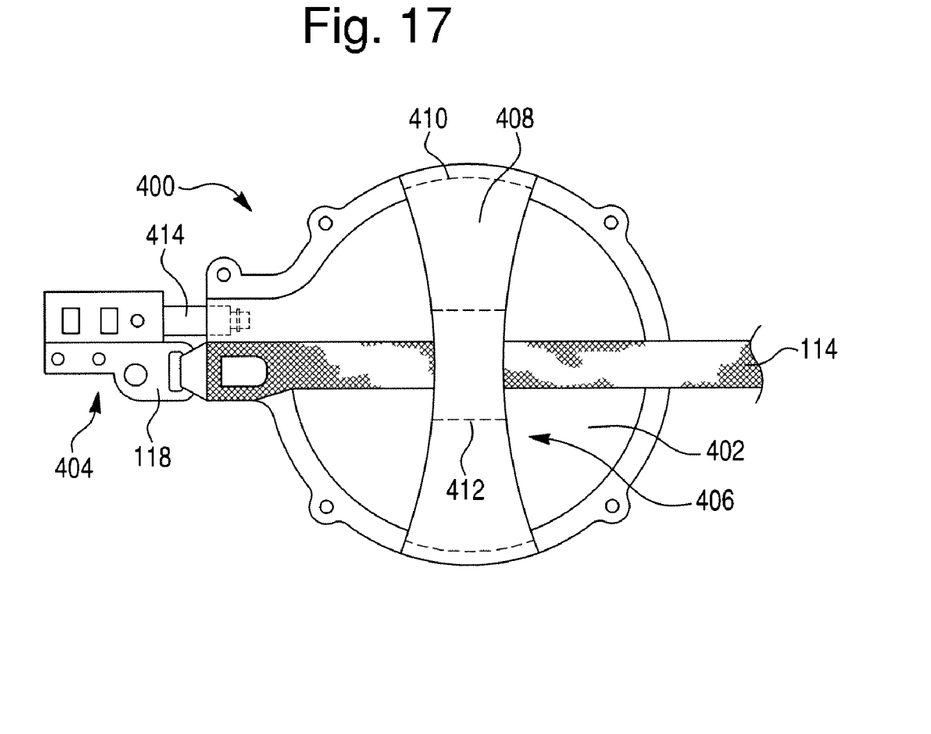
FIG. 17 is a front view of another exemplary embodiment of an airbag assembly for use within a seat safety system and is illustrated deployed or unfolded.

An example of an airbag assembly 400 which may include an airbag cushion 402, a first airbag retention mechanism 404 to connect the airbag assembly 400 to an anchor 118, a second airbag retention mechanism 406, and an inflator 414 is shown in FIG. 17. The second airbag retention mechanism 406 may be fowled by coupling a strap or tether 408 to the airbag cushion 402, whereby the webbing 114 of a seatbelt may route (may pass) through an opening formed by the strap 408 and one or more adjacent portions of the cushion to retain the cushion 402 by reducing the distance the cushion may move relative to the webbing 114 in a direction perpendicular to the longitudinal direction of the webbing. The strap 408 may couple to the airbag cushion 402 through any method (e.g., stitching, adhesive, etc.). For example, as shown in FIG. 17, the ends of the strap 408 may be coupled to non-inflatable portions of the airbag cushion 402, such as the seam portions as shown, to form the primary coupling 410, such as by stitching or other connection means.

The strap 408 of the second airbag retention mechanism 406, such as the strap 408 shown in FIG. 17, may further include a secondary coupling 412 to tailor the distance the airbag cushion 402 is allowed to move relative to the webbing in the direction perpendicular to the longitudinal direction of the webbing. For example, such as shown in FIG. 17, the second airbag retention mechanism 406 may include two secondary couplings 412 separated by a predetermined distance, which may be tailored based on the width of the webbing used to limit the movement of the airbag cushion relative to the webbing. The secondary coupling 412 may include a stitching (or other coupling method or means), which couples the portion of the strap 408 local to the stitching to a portion of at least one airbag panel of the airbag cushion 402. The secondary coupling may be configured to be structural in order to withstand the forces generated during airbag deployment, or may be configured to tear at a predetermined force. Furthermore, the second airbag retention mechanism may include any number of additional couplings.

Figure 18:
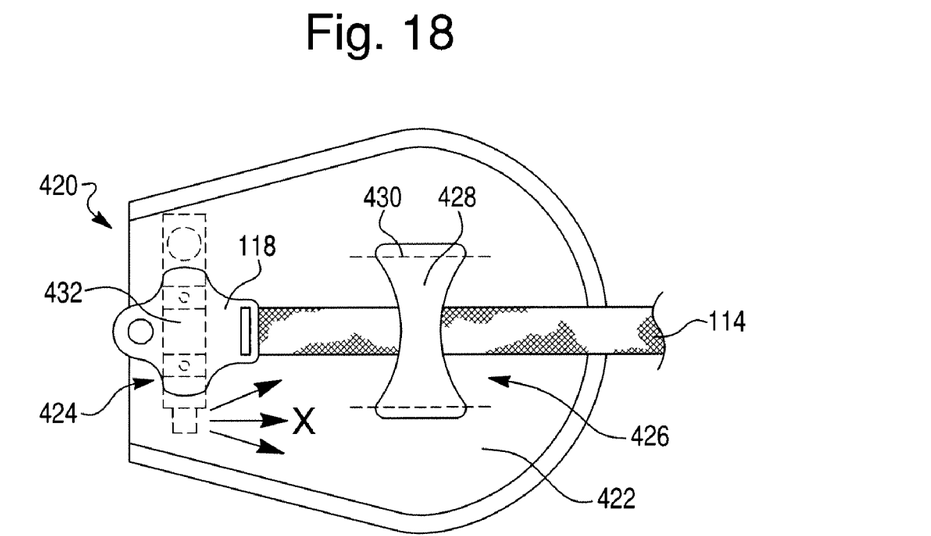
FIG. 18 is a front view of another exemplary embodiment of an airbag assembly for use within a seat safety system and is illustrated deployed or unfolded.

FIG. 18 shows an example of an airbag assembly 420 which may include an airbag cushion 422, a first airbag retention mechanism 424 to connect the airbag assembly 420 to an anchor 118 which is in turn connected to the webbing 114 of a seatbelt, a second airbag retention mechanism 426, and an inflator 432. The second airbag retention mechanism 426 may include a strap or tether 428. According to the example shown in FIG. 18, the ends of the strap 428 may couple to inflatable portions of the airbag cushion 422 to form the primary coupling 430. For example, the ends of the strap 428 may couple to one panel of the airbag cushion 422, thereby not influencing deployment of the cushion. The strap 428 may be configured to couple (e.g., by stitching) to more than one panel, such as two adjacent panels, whereby the stitching may be configured to influence deployment of the cushion or airflow within the airbag cushion, during airbag deployment. The strap 428 may be configured to couple one end to an inflatable portion of the airbag cushion 422 and to couple another end to a non-inflatable portion of the airbag cushion 422. Additionally, a strap 428 may be configured to have more than two ends, in which each end may couple to a similar or different portion of the airbag cushion 422. The primary coupling 430 may be configured to be structural in order to withstand the forces generated during airbag deployment and the secondary coupling 426 may be configured to be structural in order to withstand the forces generated during airbag deployment, or may be configured to tear at a predetermined force.

The airbag assemblies as disclosed herein may provide improved occupant protection by reducing the distance and time for deployment, as well as improving the reliability of the final deployed position relative to the occupant. The reliability of the final deployed position may further be improved by including airbag retention mechanisms, which may utilize the webbing as a guide to ensure repeatable deployment. The airbag assemblies disclosed herein may be configured to inherently deploy proximate to the pelvic region or H-point of an occupant to provide optimal pelvis protection. Those skilled in the art will recognize that seatbelt-mounted airbags may be tailored to deploy to protect any other portion of the occupant, and are not limited to providing pelvis protection. The airbag assemblies may further be configured to apply pretensioning to the safety belt system when the airbag cushion deploys to further improve restraint and protection of the occupant.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "example" and "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A seatbelt system for a vehicle, comprising:
a seatbelt anchor,
a seatbelt connected to the seatbelt anchor, and
an airbag mounted to the seatbelt anchor such that the airbag is provided separately from the seatbelt,
wherein the airbag is connected to the seatbelt by an airbag retention mechanism such that the airbag moves along the seatbelt as a guide when the airbag is deployed, and
wherein the airbag retention mechanism connects to an inflated region of the airbag.

2. The seatbelt system of claim 1, wherein the airbag is a side airbag configured to deploy in a region of a pelvic portion of an occupant of the vehicle.

3. The seatbelt system of claim 1, wherein the airbag retention mechanism is in the inflated region of the airbag.

4. The seatbelt system of claim 1, wherein the airbag retention mechanism is in a non-inflated region of the airbag.

5. The seatbelt system of claim 1, wherein the airbag applies a force to the seatbelt when the airbag is deployed such that the airbag pretensions the seatbelt.

6. The seatbelt system of claim 5, wherein the airbag is configured to deploy along an inner surface of the seatbelt such that the airbag deploys between a vehicle occupant and the seatbelt.

7. The seatbelt system of claim 6, wherein the airbag retention mechanism is in the inflated region of the airbag.

8. The seatbelt system of claim 6, wherein the airbag retention mechanism is in a non-inflated region of the airbag.

9. The seatbelt system of claim 1, wherein the airbag is configured to deploy such that the airbag faces an exterior surface of the seatbelt, which is opposite to an interior surface of the seatbelt which faces an occupant of the vehicle.

10. The seatbelt system of claim 1, further comprising an inflator.

11. The seatbelt system of claim 10, wherein the inflator is an axial flow inflator.

12. The seatbelt system of claim 10, wherein the inflator is a radial flow inflator.

13. The seatbelt system of claim 1, further comprising a housing to hold the airbag when the airbag is in an undeployed state and configured to tear when the airbag is deployed.

14. The seatbelt system of claim 1, further comprising a mounting bracket that directly connects the airbag to the seatbelt anchor.

15. The seatbelt system of claim 1, wherein the airbag retention mechanism includes a first end and a second end detached from the first end, and wherein the first end and the second end connect to the inflated portion.

16. The seatbelt system of claim 1, wherein the airbag retention mechanism extends along a middle portion of the airbag such that the airbag retention mechanism is detached from end portions of the airbag.

17. An airbag module for a vehicle, comprising:
a side airbag configured to deploy in a region of a pelvic portion of an occupant of the vehicle,
wherein the side airbag is provided as an airbag with at least one airbag panel and is configured to be mounted to a seatbelt anchor such that the side airbag is provided separately from a seatbelt,
wherein the airbag is connected to the seatbelt by an airbag retention mechanism such that the airbag moves along the seatbelt as a guide when the airbag is deployed, and
wherein the airbag retention mechanism connects to an inflated portion of the airbag.

18. The airbag module of claim 17, wherein the airbag retention mechanism includes a first end and a second end detached from the first end, and wherein the first end and the second end connect to the inflated portion.

19. The airbag module of claim 17, wherein the airbag retention mechanism extends along a middle portion of the airbag such that the airbag retention mechanism is detached from end portions of the airbag.

* * * * *